United States Patent [19]
Walter

[11] Patent Number: 5,459,699
[45] Date of Patent: Oct. 17, 1995

[54] METHOD AND APPARATUS FOR GENERATING HIGH ENERGY ACOUSTIC PULSES

[75] Inventor: Bruno H. Walter, North Vancouver, Canada

[73] Assignee: Industrial Sound Technologies, Canada

[21] Appl. No.: 936,032

[22] Filed: Aug. 25, 1992

[51] Int. Cl.⁶ .................................................. H04R 17/00
[52] U.S. Cl. .......................... 367/142; 367/143; 367/191; 181/0.5; 181/119; 210/748; 210/785
[58] Field of Search .................................... 367/142, 143, 367/171, 191; 181/0.5, 119, 120; 210/748, 785

[56] References Cited

U.S. PATENT DOCUMENTS

| 2,647,846 | 8/1953 | Bagno | 367/142 |
|---|---|---|---|
| 3,369,519 | 2/1968 | Bricout | 181/110 |
| 3,376,949 | 4/1968 | Baker et al. | 181/120 |
| 3,409,470 | 11/1968 | Karpovich | 134/1 |
| 3,536,157 | 10/1970 | Anstey | 181/120 |
| 3,690,403 | 9/1972 | Davis | 181/120 |
| 3,764,965 | 10/1973 | McLean et al. | 181/120 |
| 4,131,178 | 12/1978 | Bouyoucos | 181/120 |
| 4,252,210 | 2/1981 | Sodich | 181/119 |
| 4,271,925 | 6/1981 | Burg | 181/120 |
| 4,396,088 | 8/1983 | Bayhi | 181/120 |
| 4,713,277 | 12/1987 | Akiyama et al. | 428/131 |
| 4,830,122 | 5/1989 | Walter | 175/106 |
| 5,009,272 | 4/1991 | Walter | 175/56 |
| 5,085,783 | 2/1992 | Feke et al. | 210/748 |
| 5,129,320 | 7/1992 | Fadner | 101/365 |

FOREIGN PATENT DOCUMENTS

| 837971 | 3/1970 | Canada . |
|---|---|---|
| 1359616 | 3/1964 | France . |
| 620483 | 10/1935 | Germany . |
| 63-318993 | 12/1988 | Japan . |
| 2098498 | 11/1982 | United Kingdom . |

Primary Examiner—J. Woodrow Eldred
Attorney, Agent, or Firm—Oyen Wiggs Green & Mutala

[57] ABSTRACT

A method and apparatus are disclosed for generating intense acoustic pulses by means of the water hammer effect. The method involves generating a water hammer in a conduit by suddenly interrupting a high velocity flow of fluid through the conduit. The kinetic energy of the fluid flowing in the conduit is converted into a high pressure pulse which propagates along the conduit away from the point where the fluid flow was interrupted. The high pressure pulse deforms the wall of the conduit so as to radiate acoustic energy away from the conduit into a fluid medium surrounding the conduit. The relative amount of energy dissipated in the form of mass flow in the surrounding fluid and acoustic energy in the surrounding fluid can be adjusted by changing the characteristics of the conduit wall. The direction in which acoustic energy is radiated into the fluid medium surrounding the conduit can be set by making the conduit wall asymmetrical or by bending the conduit. Embodiments of the invention for acoustic cleaning, viscosity reduction in fluids and acoustic sedimentation are disclosed.

20 Claims, 9 Drawing Sheets

METHOD AND APPARATUS FOR GENERATING HIGH ENERGY ACOUSTIC PULSES

FIELD OF THE INVENTION

This invention relates to a method and apparatus for generating high intensity acoustic waves in a fluid and for directing the acoustic waves so generated toward a workpiece or a volume of fluid to be treated.

BACKGROUND OF THE INVENTION

It is known that high intensity acoustic pulses may be produced by deliberately creating a "water hammer". A water hammer is the high pressure pulse created when a rapidly flowing stream of fluid in a conduit is suddenly blocked. When this occurs, for example by the sudden closing of a valve, the kinetic energy of the flowing fluid is converted to a high pressure pulse. The high pressure pulse propagates upstream from the valve at a velocity which is a function of the speed of sound in the fluid in the pipe and the dimensions and elasticity of the pipe. A similar phenomenon results in a reduced pressure pulse being propagated downstream away from the valve.

When the pressure pulse arrives at a point in the conduit upstream of the valve, the fluid at that point stops flowing toward the valve. The increased pressure forces the walls of the conduit outwardly and compresses the fluid within the conduit. The motion of the walls of the conduit can create acoustic waves in a fluid medium outside of the conduit.

Fluid at a point upstream from the valve is not affected by the closing of the valve until the pressure pulse reaches that point. The mathematics of water hammer are discussed in various texts on fluid mechanics including *Fluid Mechanics (7th Edition)* Victor L. Streeter and E. Benjamin Wylie, McGraw-Hill Book Company, 1979.

It is known that the water hammer effect can be used to generate acoustic pulses for use in marine seismic exploration. Baker et al., U.S. Pat. No. 3,376,949, discloses an acoustic generator which utilizes the water hammer effect to create acoustic pulses in a fluid. The acoustic generator comprises a high energy pump for providing a stream of rapidly flowing fluid, a downwardly extending pipe through which the fluid is pumped, and a valve at the lower end of the pipe. A zone in the pipe upstream from the valve is perforated and surrounded by a heavy rubber tube.

The Baker et al. device is used by submersing the lower end of the downwardly extending pipe in a body of water and pumping fluid through the pipe at high velocity. When an acoustic pulse is desired, the valve is suddenly closed, thereby arresting the flow of fluid in the pipe and causing a water hammer within the pipe.

The water hammer pressure pulse created when the rapidly flowing fluid is brought to a halt by the closed valve propagates up the pipe toward the pump. Because the rubber tube is compliant, the pressure pulse forces the rubber tube outward as it travels up the pipe. The result is that the rubber tube displaces the surrounding water, thereby generating acoustic waves in the water surrounding the tube. A single short burst of acoustic waves is produced each time the valve is closed.

Anstey, U.S. Pat. No. 3,536,157 discloses an underwater acoustic generator, also for use in underwater seismic exploration, which is designed to be towed behind a boat. The Anstey generator comprises a length of conduit with a velocity transformer at each end and a normally-open valve near the trailing end of the conduit. When the Anstey device is towed through the water with the valve open, the velocity transformers direct a high velocity stream of water through the conduit. When the valve is suddenly closed a water hammer is set up inside the conduit. The water hammer pressure pulse travels along the conduit away from the valve. The walls of the conduit in on embodiment of the Anstey device are partially compliant so that the pressure pulse causes acoustic energy to radiate from the conduit as it travels along the conduit.

Burg, U.S. Pat. No. 4,271,925 discloses another system for generating acoustic pulses for use in seismic exploration by deliberately creating a water hammer effect within a conduit. The Burg system comprises a pressure vessel for providing a source of pressurized fluid, an acoustically transparent conduit connected to the outlet of the pressure vessel, an upstream valve between the pressure vessel and the conduit for controlling the flow of fluid from the pressure vessel into the conduit and a downstream valve at the outlet of the conduit for abruptly terminating fluid flow in the conduit.

The Burg device is used to generate an acoustic pulse by the steps of pressurizing the fluid within the pressure vessel, opening the upstream valve to allow high pressure fluid to flow into the conduit, waiting until the fluid in the conduit is flowing at a maximum velocity, and then suddenly closing the downstream valve. When the downstream valve is closed, a water hammer pressure pulse is created within the conduit. The high amplitude pressure pulse is reflected back and forth through the conduit between the upstream pressure vessel and the downstream valve. The result is that an acoustic signal pulse with a characteristic frequency dependent upon the length of the conduit is radiated away from the conduit each time the valve is closed.

Other references which disclose means for harnessing water hammer to generate acoustic waves in a fluid are Bricout, U.S. Pat. No. 3,369,519 and Davis, U.S. Pat. No. 3,690,403.

Each of the references above discloses the use of a deliberately created water hammer to produce a one-shot high amplitude burst of acoustic signals appropriate for geophysical seismic exploration. In each case, the acoustic signals are radiated from a circularly symmetrical conduit. None of the references above disclose an acoustic source having means for rapidly cycling a valve open and closed to yield a series of water hammer pulses in a conduit to produce a continuous acoustic signal with a characteristic frequency dependant upon the rate of valve operation.

Bayhi, U.S. Pat. No. 4,396,088 discloses a generator of low power, low frequency acoustic waves. The Bayhi apparatus modulates the flow of fluid flowing into an array of flexible sleeves at the desired frequency. Bayhi does not disclose the use of water hammer to generate high amplitude acoustic waves.

Acoustic cleaners using various piezoelectric, magnetostrictive or voice coil transducers are known in the prior art. For example, Japanese patent No. 63318993 discloses a clothes washing machine which uses sonic energy to clean clothes. The sonic energy is generated by means of a voice coil which vibrates one wall of a compartment containing the clothes.

An example of the use of ultrasonic waves for cleaning items is the ultrasonic cleaning bath which is commonly used in laboratories for cleaning small items. Such prior art ultrasonic cleaning baths operate at high frequencies, typically above 20,000 Hz, and at acoustic intensities which are typically much lower than the acoustic power levels developed by the present invention. The acoustic signals in ultrasonic cleaning baths are typically developed by means of piezoelectric or magneto-strictive transducers. These prior art ultrasonic transducers are essentially pistons which can be reciprocated very rapidly to generate an acoustic signal. When such prior art ultrasonic transducers are operated at high intensities cavitation can occur in the fluid near the ultrasonic transducer during the retraction phase of the piston. The cavitation bubbles interfere with the propagation of the ultrasonic beam. It is therefore difficult to generate high intensity acoustic signals using such transducers.

A further disadvantage of prior art ultrasonic transducers in applications where an object or body of fluid is to be treated at a distance from the transducer is that the attenuation of high frequency acoustic waves in typical fluids is much greater than the attenuation of lower frequency acoustic waves in the same fluids. Therefore, high intensity compressional pulses delivered at comparatively low frequency can be more effective for treating materials at long distances from a transducer than high frequency, relatively low intensity ultrasonic waves.

The disadvantages of prior art transducers is compounded in some applications by dispersion effects. As an intense, high frequency acoustic wave travels in a fluid, adjacent pressure peaks in the wave tend to spread out and merge with each other. This effect can cause particular problems at ultrasonic frequencies because at such frequencies the wavelength is short and adjacent pressure peaks are close together. The effectiveness of an acoustic wave for cleaning or for other applications can be reduced by spreading of the acoustic pressure peaks in the wave. These dispersion effects could be reduced by increasing the distance between the pressure peaks in the acoustic wave (i.e. by lowering the frequency of the acoustic wave). However, lowering the frequency of a sinusoidal acoustic wave, which is the type of acoustic wave most commonly produced by prior art transducers, while holding the intensity of the wave constant has the effect of increasing the rise time for each of the pressure pulses in the acoustic wave. This, in turn, may reduce the effectiveness of the acoustic wave for cleaning or for other applications. Ideally, a generator of acoustic waves for cleaning or other material treatment applications would be capable of producing distinct pressure pulses, with very fast rise times, separated by a selected interval.

Water hammer has been used for cleaning the inside of pressure vessels and tubes. For example, Canadian patent No. 837971 discloses a method for cleaning a heat exchanger tube. The method comprises the steps of passing fluid through the heat exchanger tube, heating the fluid to near its boiling point and suddenly and repeatedly interrupting the flow of the fluid at the tube inlet. Interrupting the fluid flow causes low pressure pulses to propagate through the tube. The low pressure pulses clean the inner surface of the tube by causing the fluid to boil at the tube's inner surface. Karpovich, U.S. Pat. No. 3,409,470 discloses a similar method. These references do not disclose the use of water hammer for cleaning objects in a medium external to the tube in which the water hammer is generated.

Acoustic fields have also been used for removing sediment from fluids. For example, United Kingdom patent No. 2098498 discloses a system for removing sediment from a flowing fluid which comprises a pair of opposed ultrasonic transducers for generating a drifting standing wave across the direction of fluid flow. The standing wave sets up pressure gradients in the fluid which collect particles of sediment. As the standing wave drifts, the collected particles of sediment are swept into a collection zone.

A problem with the prior art water hammer acoustic generators discussed above is that they are designed to produce single bursts of acoustic waves for seismic exploration. A one-shot acoustic generator is not optimal for acoustic cleaning, acoustic sedimentation or similar uses where a substantially continuous acoustic signal is desirable to minimize processing times.

A further disadvantage of the prior art water hammer acoustic generators described above is that these generators emit acoustic waves in a pattern which is symmetrical about the axis of the conduit in which water hammer is created. An axially symmetric radiation field is useful in seismic exploration but is wasteful of acoustic energy in situations where it is desired to concentrate acoustic waves to treat a volume of fluid or a workpiece.

SUMMARY OF THE INVENTION

This invention provides a method and apparatus for producing continuous high intensity acoustic waves in a fluid.

The invention provides an acoustic generator comprising: a source of pressurized fluid; a conduit communicating with the source for carrying a flow of fluid from the source; a valve capable of interrupting the flow of fluid in the conduit at a location spaced from the source; and means for closing the valve while the fluid is flowing within the conduit to produce a water hammer within the conduit. The conduit has a longitudinal axis and an outer wall enclosing a hollow interior. The compliance of a portion of the wall of the conduit varies according to the angular position around the longitudinal axis.

The invention further provides an acoustic generator comprising: a source of pressurized working fluid; a conduit communicating with the source; a valve at a location spaced from the source; and control means for repeatedly closing and opening the valve at a frequency greater than 3 Hz to produce a water hammer within said conduit each time the valve is closed. The conduit carries a flow of working fluid from the source within the conduit. The valve is capable of interrupting the flow of working fluid out of the conduit.

The invention further provides an acoustic cleaner for cleaning a workpiece in a cleaning fluid. The cleaner comprises: a source of pressurized working fluid and a conduit communicating with the source. The conduit has a wall for confining a flow of working fluid from the source within the conduit. At least a portion of the wall is in contact with the cleaning fluid. The cleaner further comprises a valve connected to the conduit at its end away from the source. The valve is capable of blocking the flow of working fluid out of the conduit. The cleaner further comprises control means for repeatedly closing and opening the valve to produce a water hammer within the conduit each time the valve is closed.

The invention further provides apparatus for lowering the viscosity of a viscous fluid. The apparatus comprises: a chamber containing the viscous fluid, the chamber having an inlet and an outlet; a source of pressurized working fluid; a conduit communicating with the source, the conduit carrying a flow of working fluid from the source within said conduit; a valve capable of blocking the flow of the working fluid in the conduit; and control means for repeatedly closing and opening the valve to produce a water hammer within the conduit each time the valve is closed.

The invention further provides apparatus for lowering the viscosity of a viscous fluid. The apparatus comprises: means for pressurizing the viscous fluid; a conduit communicating with the pressurizing means, the conduit being capable of carrying a flow of viscous fluid from the pressurizing means within the conduit; a valve capable of interrupting the flow of the viscous fluid in the conduit; and control means for repeatedly closing and opening the valve to produce a water hammer within the conduit when the valve is closed.

The invention further provides an acoustic radiator driven by a flow of pressurized fluid from a source of pressurized fluid for generating acoustic pulses in a fluid. The acoustic radiator comprises: a mandrel having a channel in communication with the source for delivering the pressurized fluid to a first point on the surface of the mandrel; an elastic sleeve stretched over a first region of the surface of the mandrel, the first region including the first point; a groove in the first region for carrying a flow of the pressurized fluid from the first point to a second point in the first region, the groove having a narrow opening; and a valve in communication with the second point for suddenly interrupting the flow of the fluid in the groove.

The invention further provides a method for producing work at a point in a fluid by means of acoustic signals. The method comprises the steps of: (a) connecting a source of a pressurized working fluid to the inlet of a conduit having an inlet and an outlet; (b) allowing the working fluid to flow through the conduit; (c) suddenly blocking the flow of working fluid at said outlet to cause acoustic signals to be radiated from the conduit to the point; (d) waiting for an interval; (e) removing the blockage of the working fluid from the outlet; and (f) continuously repeating steps (b), (c), (d) and (e) at a frequency sufficient to carry out the work. The work may be acoustic cleaning, viscosity reduction, removal of suspended particles from a volume of fluid or some other form of work which can be done by a series of acoustic pulses in a fluid.

The invention further provides a method for cleaning an object. The method comprises the steps of placing the object in a fluid medium and creating a low frequency series of high energy acoustic pulses in the fluid medium.

BRIEF DESCRIPTION OF THE DRAWINGS

An embodiment of the invention will now be described by way of example with reference to the following drawings in which.

DETAILED DESCRIPTION OF THE PREFERRED EMBODIMENT

Figure 1:
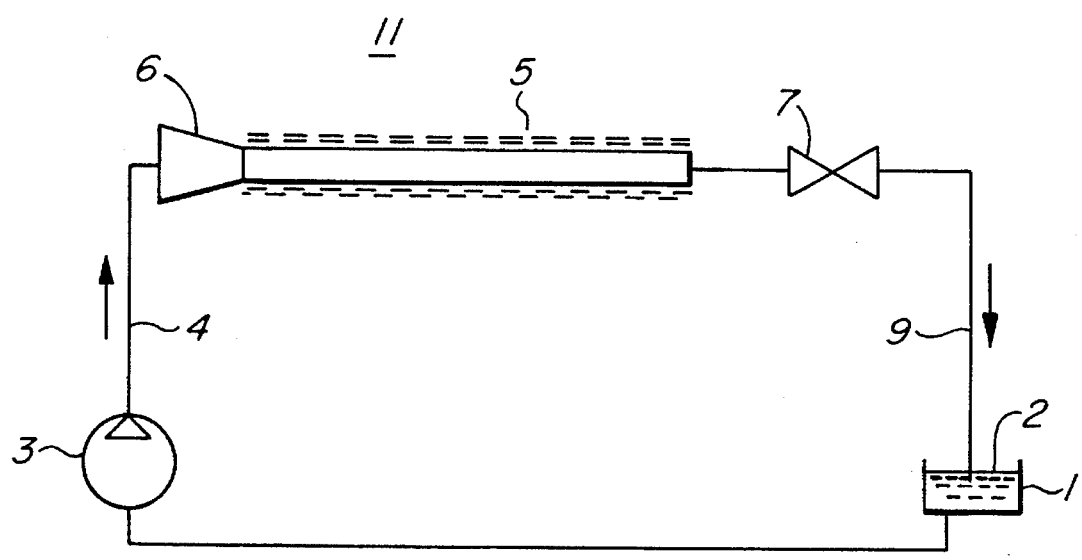
FIG. 1 is a schematic diagram of an acoustic generator according to the invention.

FIG. 1 is a schematic diagram of an acoustic generator according to the invention. The acoustic generator provides a hydraulic circuit comprising fluid storage tank I containing working fluid 2, pump 3, fluid delivery conduit 4, radiating conduit 5, valve 7 and fluid return conduit 9. Pump 3 draws working fluid 2 from fluid storage tank I and forces it to flow at high velocity through fluid delivery conduit 4 into radiating conduit 5. It should be understood that pump 3 may be replaced with a pressurized reservoir, or any other source of high pressure fluid without departing from the scope of the invention.

It is desirable to maximize the velocity of flow of working fluid 2 within radiating conduit 5. To this end, fluid delivery conduit 4 may be constructed with a greater cross sectional area than radiating conduit 5 and a velocity transformer 6 may be provided between conduit 4 and radiating conduit 5. Velocity transformer 6 may be a tapered section of conduit having a gradually reducing cross sectional area.

Upon exiting radiating conduit 5, working fluid 2 passes through valve 7, which is normally open. After exiting valve 7, working fluid 2 is returned to fluid storage tank 1 through fluid return conduit 9.

Acoustic waves are generated by suddenly closing valve 7 to cause a water hammer pressure pulse to propagate upstream through radiating conduit 5. Valve 7 need not be completely closed to create a satisfactory water hammer effect. It has been shown (Walter, U.S. Pat. No. 4,830,122) that an adequate water hammer effect may be created as long as the cross sectional area of the flow passage of valve 7 in its "closed" position observes the following relationship:

$$A_r \leq A_0(H_0/(pW_cW))^{1/2} \qquad (1)$$

where:

$A_o$=area of valve 7 open to flow of working fluid 2 when valve 7 is fully open;

$A_r$=area of valve 7 open to flow of fluid at full restriction of valve 7 (i.e. when valve 7 is in its "closed" position);

$W_c$=velocity of a sound wave in working fluid 2;

W=velocity of working fluid 2 through conduit 5 upstream from valve p=specific mass of working fluid 2, (i.e. the density of working fluid 2 divided by the acceleration of gravity); and $H_0$=the pressure head across valve 7 when valve 7 is open.

The intensity of the water hammer pulses produced within radiating conduit 5 increases with the velocity of working fluid 2 within radiating conduit 5 at the moment valve 7 is closed. As noted above, it is therefore desirable to maximize the flow velocity of working fluid 2 within radiating conduit 5. Radiating conduit 5 should not be so large in cross sectional area that pump 3 cannot deliver enough flow of working fluid 2 at the rated output pressure of pump 3 to maintain a maximum velocity flow of working fluid 2 within radiating conduit 5.

Figure 2:
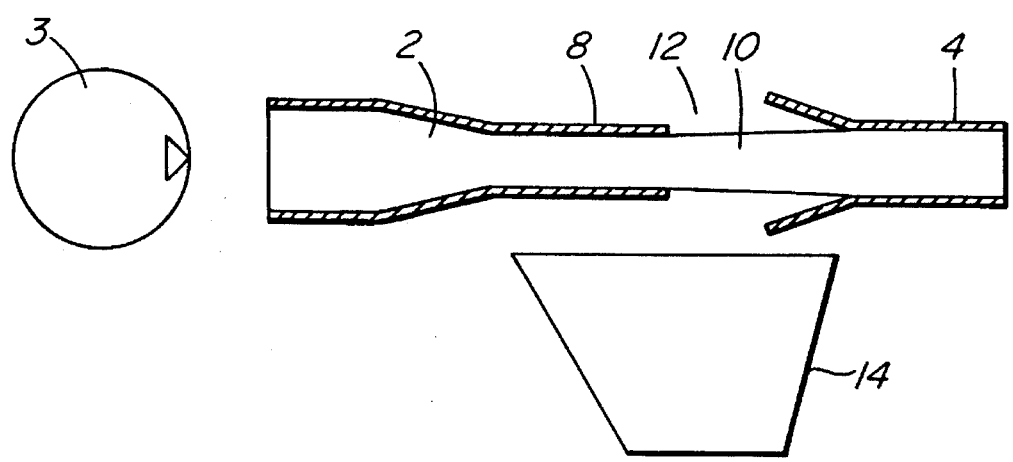
FIG. 2 is a schematic diagram of a means for isolating the pump shown FIG. 1 from pressure pulses generated by the invention.

If pump 3 is of a type which could be damaged or impaired in its operation by pressure pulses propagating upstream from valve 7 through fluid delivery conduit 4 then an air gap may be provided between the outlet of pump 3 and the inlet of fluid delivery conduit 4. As shown in FIG. 2, working fluid 2 is expelled from the outlet of pump 3 through nozzle 8 in the form of a jet 10. Jet 10 shoots into the inlet of conduit 4 through air gap 12. Pressure pulses reaching air gap 12 are dissipated and do not affect the operation of pump 3. Fluid leaking from air gap 12 falls into sump 14 from where it can be recycled.

Radiating conduit 5 is either submersed or partially submersed in a fluid 11. As described below with reference to FIGS. 4 and 5, radiating conduit 5 is designed to radiate energy from pressure pulses inside radiating conduit 5 into fluid 11 in the form of acoustic pulses. A continuous train of acoustic pulses may be radiated into fluid medium 11 by rapidly closing and re-opening valve 7.

The characteristics of the acoustic signal radiated into fluid medium 11 from radiating conduit 5 depend upon the frequency at which valve 7 is closed and opened, the proportion of each cycle during which valve 7 is open and closed, the characteristics of radiating conduit 5, the characteristics of working fluid 2, the velocity of flow of working fluid 2 inside radiating conduit 5 and the characteristics of fluid 11.

When valve 7 is closed, working fluid 2 immediately upstream from valve 7 is brought to rest. When valve 7 is reopened, the working fluid 2 upstream from valve 7 begins to flow through valve 7. It takes some time after valve 7 is reopened for the working fluid 2 immediately upstream from valve 7 to be accelerated to its maximum velocity.

To maximize the amount of acoustic energy transmitted into fluid medium 11, valve 7 should be closed as soon as the fluid within radiating conduit 5 has been accelerated to a significant proportion of its maximum velocity. Valve 7 should then be reopened before the pressure pulse created by the closure of valve 7 reaches the upstream end of radiating conduit 5. In some applications it may be desirable to hold valve 7 open for an additional interval in each cycle to increase the separation between pulses.

Figure 3A:
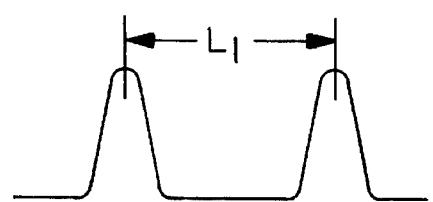
FIGS. 3A through 3F are a series of graphs illustrating the dispersion of adjacent pressure pulses in an acoustic wave as the acoustic wave travels through a fluid.
Figure 3B:
Figure 3C:
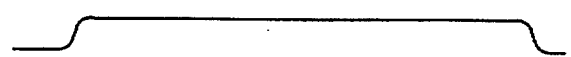

FIGS. 3A through 3F illustrate the advantage which may be obtained by increasing the separation between adjacent pulses in an acoustic signal. FIG. 3A shows a pair of pulses in an acoustic wave separated by a distance $L_1$ as the pulses appear at a distance $D_1$ from the transducer (not shown) where the pulses were generated. FIGS. 3B and 3C show the same pair of pulses after the acoustic wave has propagated away from the transducer to distances $D_2$ and $D_3$ from the transducer respectively. As shown in FIG. 3A, the pulses are initially well formed but, as shown in FIGS. 3B and 3C, the pulses disperse as the acoustic wave propagates away from the transducer. As shown in FIG. 3C, when the acoustic wave has propagated to point $D_3$ the pulses have spread so much that they have merged and are no longer distinguishable from one another.

Figure 3D:
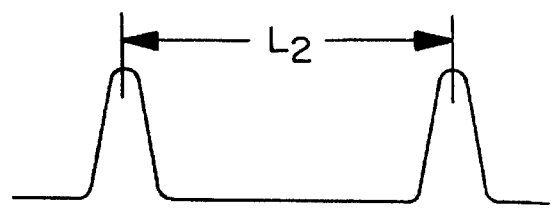
Figure 3E:
Figure 3F:

FIGS. 3D through 3F show a pair of pulses which are identical to the pulses shown in FIGS. 3A through 3C except that their crests are separated by a distance $L_2$ which is greater than the distance $L_1$. FIGS. 3D, 3E and 3F show the pulses at distances $D_1$, $D_2$, and $D_3$ respectively. The pulses shown in FIGS. 3D through 3F broaden as they propagate in the same way as the pulses shown in FIGS. 3A through 3C. However, because the pulses shown in FIGS. 3D through 3F are more widely separated than the pulses shown in FIGS. 3A through 3C, the pulses remain distinct even after they have propagated through distance $D_3$. Therefore, a train of pulses separated from each other by a greater distance $L_2$, as shown in FIGS. 3D through 3F, may be more effective than a train of more closely spaced pulses in applications where an acoustic generator is located far from an item or a volume of fluid to be treated.

The frequency of operation of valve 7 should therefore be on the order of the frequency given by the equation:

$$f = \frac{1}{t + t_d + \frac{L}{W_c}} \qquad (2)$$

Where:

f is the frequency of operation of valve 7;

L is the distance to the upstream end of radiating conduit 5 from valve 7;

$W_c$ is the speed at which pressure pulses propagate along radiating conduit 5 in working fluid 2;

t is the time required for working fluid 2 in conduit 5 to be accelerated to a significant proportion of its maximum velocity after valve 7 is reopened; and $t_d$ is a delay time to increase the separation between pulses as desired in a particular application.

Figure 15:
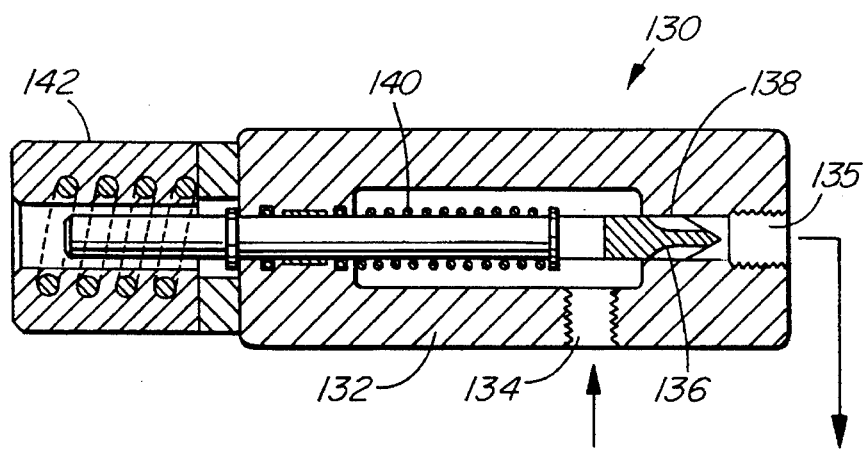
FIG. 15 is a section through a solenoid activated valve which may be used in the acoustic generator of FIG. 1.
Figure 16:
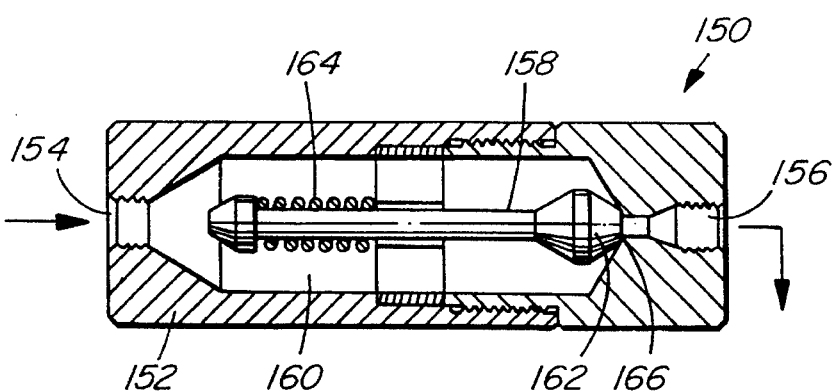
FIG. 16 is a section through a flow operated valve which may be used in the acoustic generator of FIG. 1.
Figure 17:
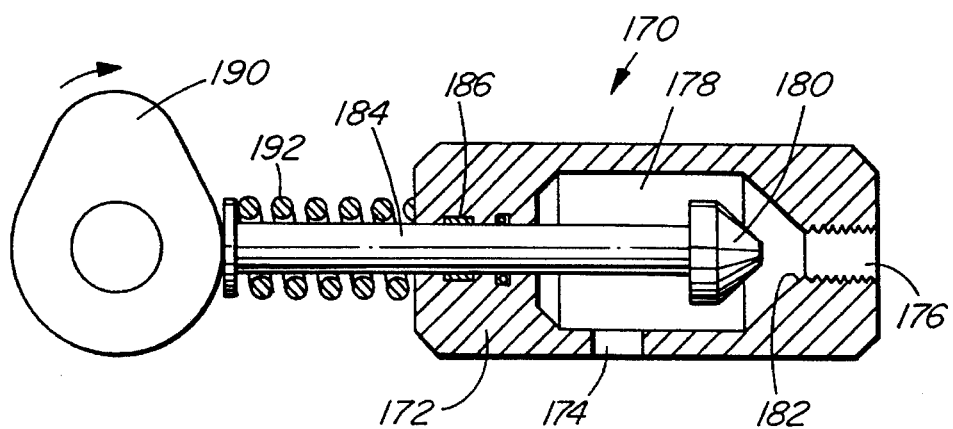
FIG. 17 is a section through a cam operated valve which may be used in the acoustic generator of FIG. 1.

Valve 7 must be of a type which can be opened and closed at the desired frequency. For example, valve 7 may be a solenoid activated needle valve as shown in FIG. 15 and described below, a self-actuating valve operated by the flow of working fluid 2 as shown in FIG. 16 and described below or a cam-operated valve as shown in FIG. 17 and described below.

The pattern of sound radiated by radiating conduit 5 depends on the construction and configuration of radiating conduit 5. Radiating conduit 5 may be bent, for example into a spiral, to direct sound radiated by radiating conduit 5 preferentially into a selected volume of fluid. Radiating conduit 5 may also be bent to fit a longer length of radiating conduit 5 into a volume of fluid. As noted above, a long radiating conduit 5 can be optimally operated at a lower frequency, in some cases, than a shorter radiating conduit 5.

The sound radiated by radiating conduit 5 may also be made directional by constructing the wall of radiating conduit 5 so that one or more of its characteristics, such as modulus of elasticity, density, or wall thickness, vary over the surface of radiating conduit 5.

FIGS. 4A through 4D are cross-sections through a first embodiment of radiating conduit according to the invention.

Figure 4A:
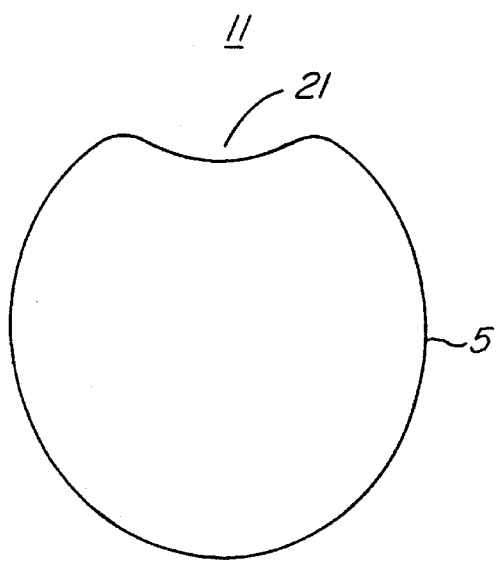
FIGS. 4A, 4B, 4C and 4D are sections through one embodiment of a radiating conduit according to the invention. These Figures depict the sequence of events that occur when a water hammer pulse propagates through a radiating conduit.

The radiating conduit of FIGS. 4A through 4D is designed to radiate an acoustic signal into a fluid 11 surrounding radiating conduit 5 in such a way that the acoustic signal is accompanied by a significant mass flow in fluid 11. As shown in FIG. 4A, the wall of radiating conduit 5 is depressed inwardly along a longitudinal area 21 in its outer surface. Longitudinal area 21 is more compliant than other areas on the surface of radiating conduit 5. Instead of being indented, longitudinal area 21 may be constructed of a different material from the rest of conduit 5 or may be thinner than other portions of the surface of conduit 5. As described below, acoustic waves are emitted more strongly from longitudinal area 21 of radiating conduit 5 than from other areas on the surface of radiating conduit 5. This makes it possible to concentrate the energy of the acoustic field emitted by radiating conduit 5 in a particular direction.

Figure 4B:
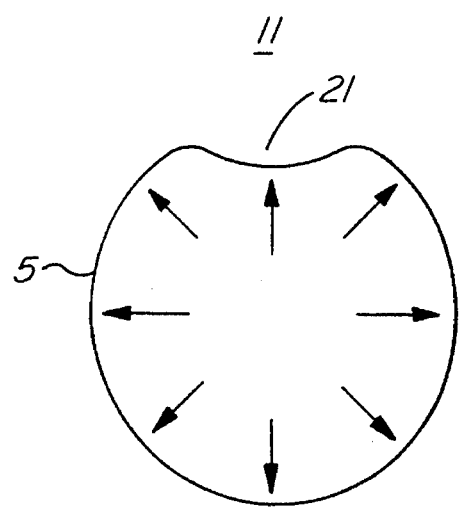
Figure 4C:
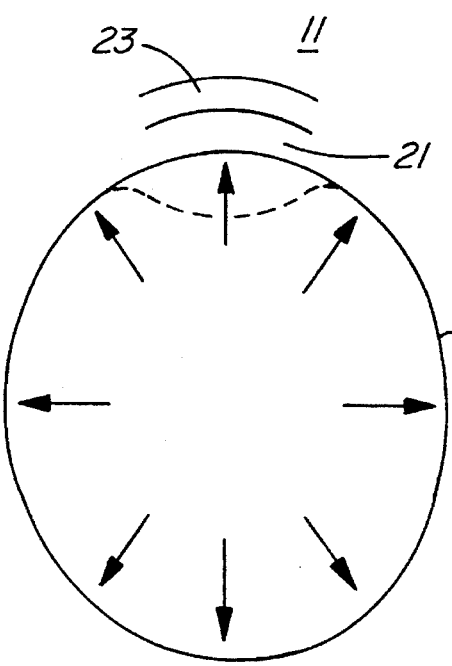
Figure 4D:
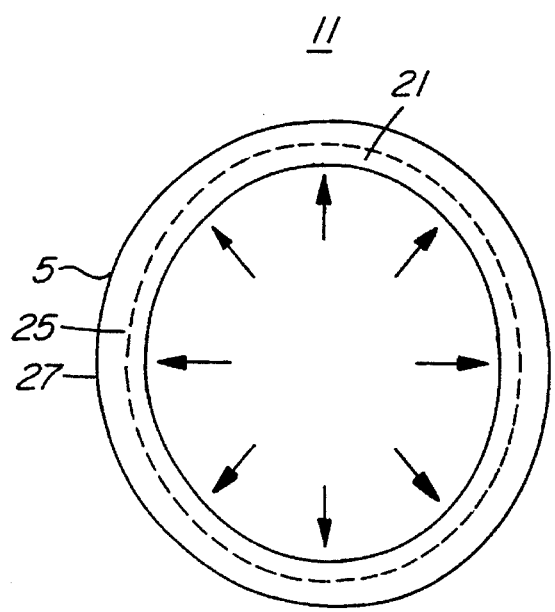

When a water hammer pressure pulse propagates through radiating conduit 5 the fluid inside radiating conduit 5 becomes pressurized, as is indicated by the arrows in FIG. 4B. As longitudinal area 21 is initially more compliant than other parts of the walls of radiating conduit 5, the water hammer pressure pulse forces longitudinal area 21 outwardly until radiating conduit 5 is circular as shown in FIG. 4C. During this phase, longitudinal area 21 acts essentially like a diaphragm and pushes fluid 11 ahead of it as it moves outwards. This causes an acoustic wave 23 to be propagated away from longitudinal area 21 into fluid 11. Acoustic wave 23 is accompanied by a significant mass flow in the region of fluid 11 adjacent to longitudinal area 21 as fluid 11 is pushed ahead of longitudinal area 21.

After longitudinal area 21 has been forced outwardly until radiating conduit 5 is circular, as shown in FIG. 4C, the compliance of longitudinal area 21 is not significantly different from the compliance of other portions of the surface of radiating conduit 5. If the fluid flowing within radiating conduit 5 has not completely ceased to flow at this point, then the walls of radiating conduit 5 will be expanded outwardly as the kinetic energy of the still flowing working fluid 2 is converted into increased pressure within radiating conduit 5. The sudden expansion of radiating conduit 5 is indicated by dashed line 25 in FIG. 4D. The expansion of radiating conduit 5 causes an acoustic compressional wave front 27 to be radiated into fluid 11 away from radiating conduit 5. If the wall of radiating conduit 5 is acoustically transparent acoustic compressional wave front 27 is accompanied by very little mass flow in fluid 11.

The acoustic waveform generated in fluid 11 by a series of water hammer cycles within radiating conduit 5 is a train of pulses. One pulse is created each time valve 7 is cycled from open to closed. Each pulse has a moderately sudden onset, which corresponds to acoustic wave 23, followed by a sudden sharp pressure spike, which corresponds to acoustic wave 27.

The relative proportion of the energy radiated from radiating conduit 5 in the form of mass flow in fluid medium 11, acoustic waves 23 and acoustic waves 27 may be controlled by altering the construction of radiating conduit 5. If longitudinal area 21 is compliant through only a small range of motion then most of the energy radiated from radiating conduit 5 will be in the form of compressional acoustic waves 27 with very little mass flow in fluid medium 11. In applications such as sonically driving sediment out of fluid medium 11, mass flow in fluid medium 11 is not desirable. In such applications, radiating conduit 5 does not need a longitudinal region 21 or else longitudinal region 21 should have a very limited range of motion through which it has increased compliance so that very little mass flow is generated in fluid 11 by water hammer within radiating conduit 5. In other applications, such as washing clothes, a significant mass flow in fluid medium 11 is desirable. For such applications, the outer wall of radiating conduit 5 should be compliant through a larger range of motion.

Figure 5:
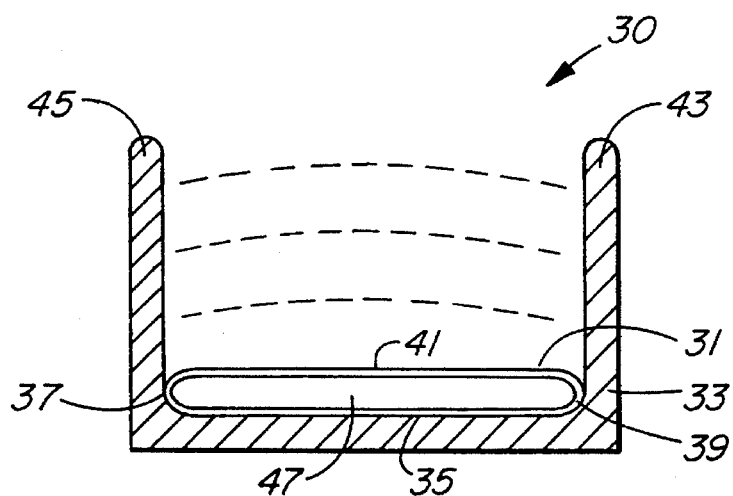
FIG. 5 is a section through an alternative embodiment of a radiating conduit according to the invention.

FIG. 5 is a section through an alternative embodiment of a directional radiating conduit 30 according to the invention. Radiating conduit 30 comprises a flattened tube 31 lying within the channel of a rigid U-shaped bar 33. The bottom surface 35 of tube 31 and the end regions 37, 39 of tube 31 are supported by U-shaped bar 33. The result is a radiating conduit 30 in which only the top surface 41 of tube 31 is able to move in response to pressure pulses in interior 47 of conduit 30. The cross sectional shape of flattened tube 31 provides a radiating conduit 30 with a small cross sectional area, which is desirable, as noted above, and a reasonably large surface area.

When a water hammer pulse travels through radiating conduit 30, as described above with reference to radiating conduit 5 in FIG. 2, the expansion of radiating conduit 30 occurs almost entirely on top side 41 of tube 31. The result is that acoustic energy is emitted preferentially from top side 41 of tube 31 and very little acoustic energy is radiated from bottom surface 35 or end regions 37, 39 of tube 31. Projecting sides 43, 45 of U-shaped bar 33 may serve to further shape the sound pulse emitted by radiating conduit 30.

Figure 6:
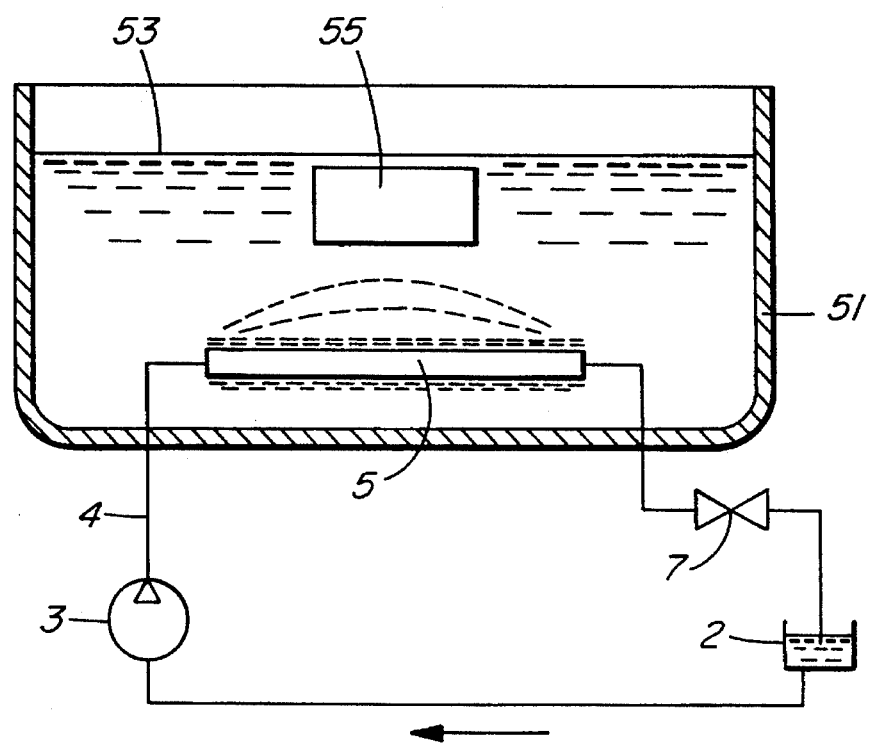
FIG. 6 is a schematic diagram showing an embodiment of the invention adapted for acoustic cleaning.

FIG. 6 is a schematic diagram showing an embodiment of the invention adapted for acoustic cleaning. In this embodiment, radiating conduit 5 lies within vat 51 which is filled with cleaning fluid 53. An item to be cleaned 55 is immersed in cleaning fluid 53 adjacent to radiating conduit 5. Acoustic energy is generated at radiating conduit 5 by creating a water hammer in working fluid 2 within radiating conduit 5 as is described above with reference to FIG. 1. In the embodiment of FIG. 6, working fluid 2 is isolated from cleaning fluid 53. Radiating conduit 5 is arranged so as to direct acoustic energy preferentially toward item to be cleaned 55. Radiating conduit 5 may be curved to simultaneously irradiate different faces of item to be cleaned 55. The mass flow which is created in cleaning fluid 53 by the expansion and contraction of radiating conduit 5 aides the cleaning process.

Figure 7:
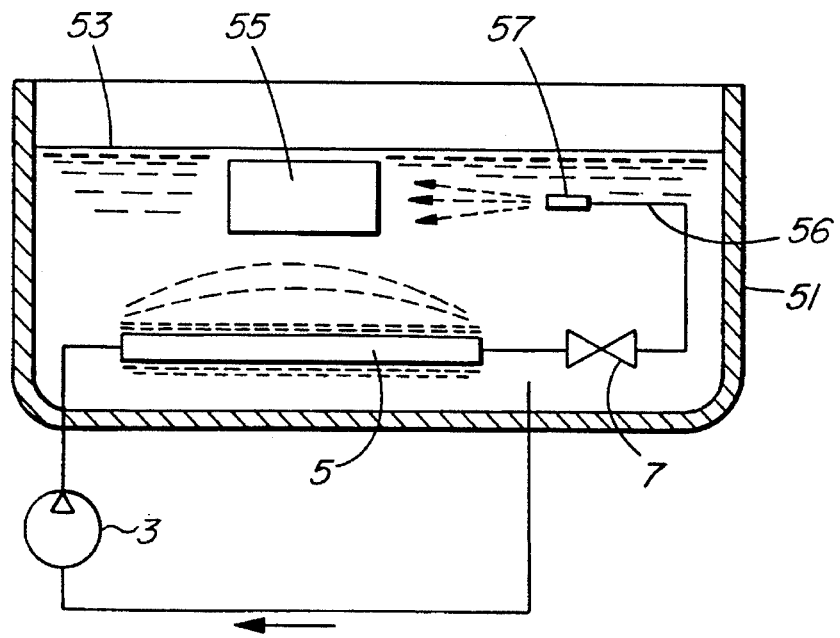
FIG. 7 is a schematic diagram showing an alternative embodiment of the invention adapted for acoustic cleaning which provides a pulsating jet of fluid which may be directed at a workpiece.

FIG. 7 is a schematic diagram of an alternative embodiment of the invention adapted for acoustic cleaning. In the embodiment of FIG. 7, cleaning fluid 53 is used as a working fluid. Pump 3 draws cleaning fluid 53 directly from vat 51 (rather than drawing working fluid 2 from tank 1 as shown in the embodiment of FIG. 6). This embodiment of the invention is advantageous because it allows the water hammer pulses propagating downstream from valve 7 to be applied to item to be cleaned 55. This is done by directing the fluid exiting from valve 7 toward item to be cleaned 55 through hose 56 and nozzle 57. The pulsating jet of cleaning fluid 53 emerging from nozzle 57 and the acoustic pulses emanating from nozzle 57 contribute to better cleaning of item to be cleaned 55.

Because acoustic cleaning apparatus according to this invention is capable of providing acoustic pulses of high intensity, the rate of cleaning is greater than that of acoustic cleaning systems which provide lower intensity acoustic pulses. This permits cleaning using solvents which have desirable properties, such as the property of being biodegradable, but which are unsuitable for use in prior art acoustic cleaners because the rate of cleaning in such solvents is unacceptably slow at the lower acoustic intensities provided by commonly available prior art acoustic cleaners.

Figure 8:
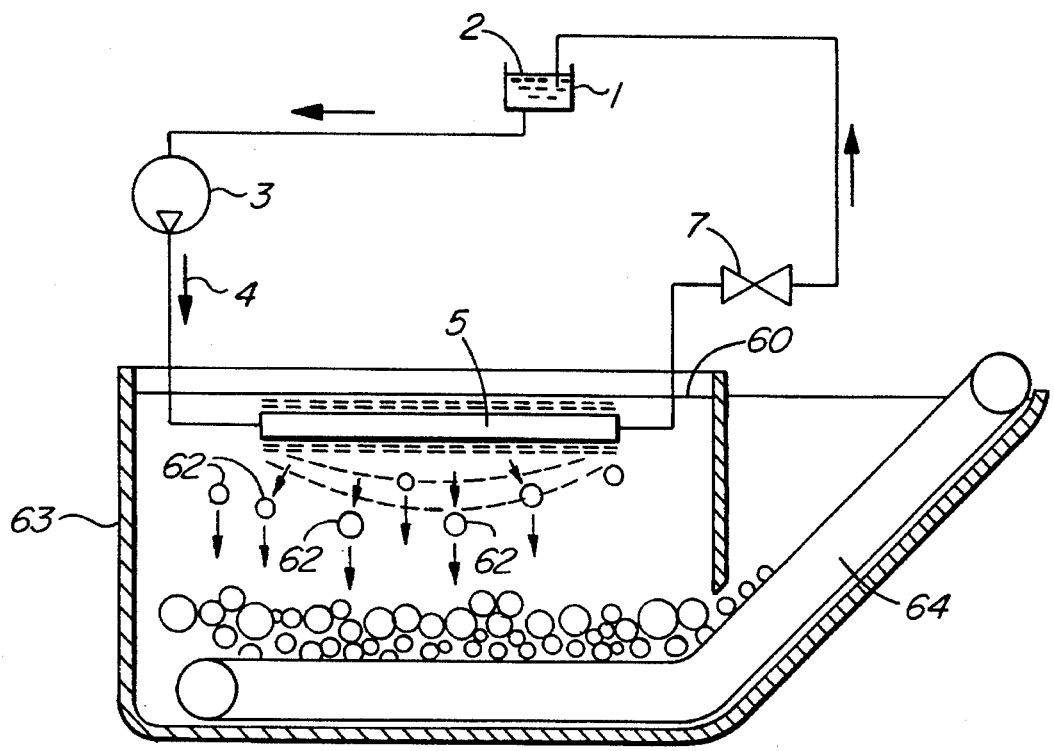
FIG. 8 is a schematic diagram of an acoustic generator according to the invention adapted to promote the sedimentation of suspended particles in a fluid.

FIG. 8 is a schematic diagram of an acoustic generator according to the invention adapted to promote the sedimentation of suspended particles in a fluid. In the embodiment of FIG. 8, radiating conduit 5 is immersed in a dirty fluid 60 containing suspended particles 62. The action of the acoustic field generated at radiating conduit 5 on suspended particles 62 causes suspended particles 62 to be precipitated out of dirty fluid 60 fluid onto the bottom of vat 63. Suspended particles 62 which sink to the bottom of vat 63 are removed by conveyor 64.

Apparatus similar to that shown in FIG. 8 may be used for large scale sedimentation, for example, it may be used to increase the rate of sedimentation in a lake. In such large scale uses, radiating conduit 5 could be suspended from a raft floating in the lake near to the surface of the lake and oriented to direct acoustic pulses downward. The equipment for driving radiating conduit 5 could be mounted on the raft.

Figure 9:
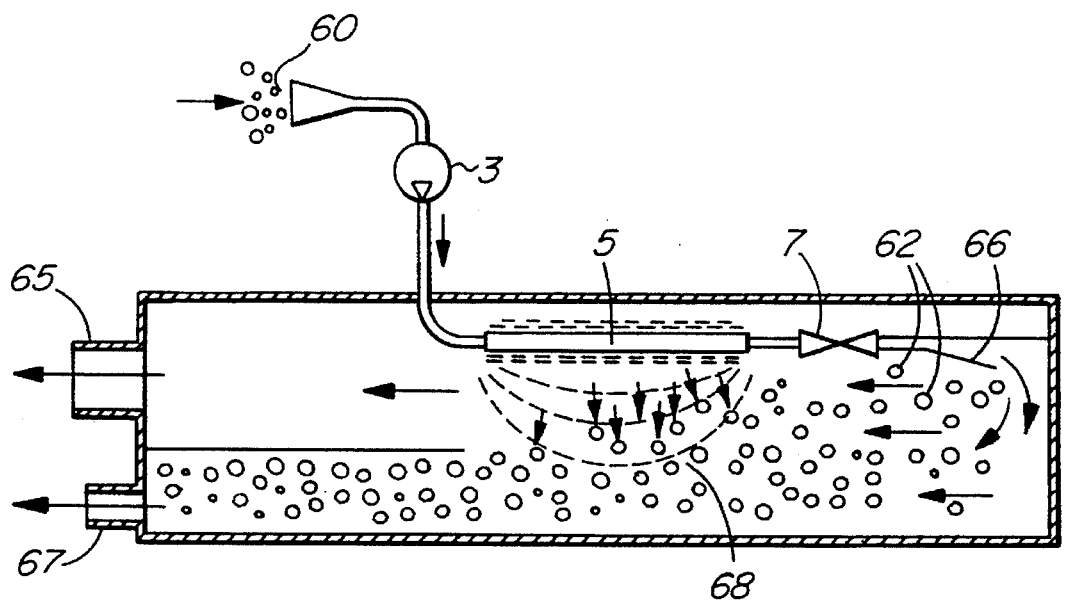
FIG. 9 is a schematic diagram of an alternative embodiment of an acoustic generator adapted to promote the sedimentation of suspended particles in a fluid wherein the fluid containing the suspended particles is used to drive the acoustic generator.

FIG. 9 is a schematic view of an alternative embodiment of a system for separating suspended particles from a dirty fluid 60 in which dirty fluid 60 is used to generate the acoustic field used to increase the rate of sedimentation. In the embodiment of FIG. 9, dirty fluid 60 containing suspended particles 62 is pumped by pump 3 into radiating conduit 5. Radiating conduit 5 lies within chamber 68. Water hammer pulses are generated inside radiating conduit 5 by repeatedly closing and re-opening valve 7 as described above with reference to FIG. 1. Radiating conduit 5 is preferably oriented so that the acoustic energy derived from the water hammer pulses within radiating conduit 5 is directed primarily downward.

Upon exiting from valve 7, dirty fluid 60 travels through diffuser 66 into chamber 68. Diffuser 66 slows the flow of dirty fluid 60 to aid in sedimentation. Chamber 68 has a cross-sectional area significantly larger than that of radiating conduit 5. Therefore, the velocity of dirty fluid 60 in chamber 68 is much lower than the velocity of dirty fluid 60 in radiating conduit 5. Upper outlet 65 and lower outlet 67 are at the end of chamber 68 away from diffuser 66. Dirty fluid 60 flows through chamber 68 past radiating conduit 5 before it is drawn off from chamber 68 through outlets 65, 67.

Lower outlet 67 draws off fluid from the lower portion of chamber 68 and upper outlet 65 draws off fluid from the upper portion of chamber 68. As dirty fluid 60 passes by radiating conduit 5, the acoustic pulses produced at radiating conduit 5 drive suspended particles 62 downward into the lower portion of chamber 68. Therefore, the fluid drawn off at lower outlet 67 contains a higher proportion of suspended particles 62 than the fluid drawn off at upper outlet 65. A conveyor (not shown) may be provided to remove suspended particles 62 which settle to the bottom of chamber 68.

Figure 10:
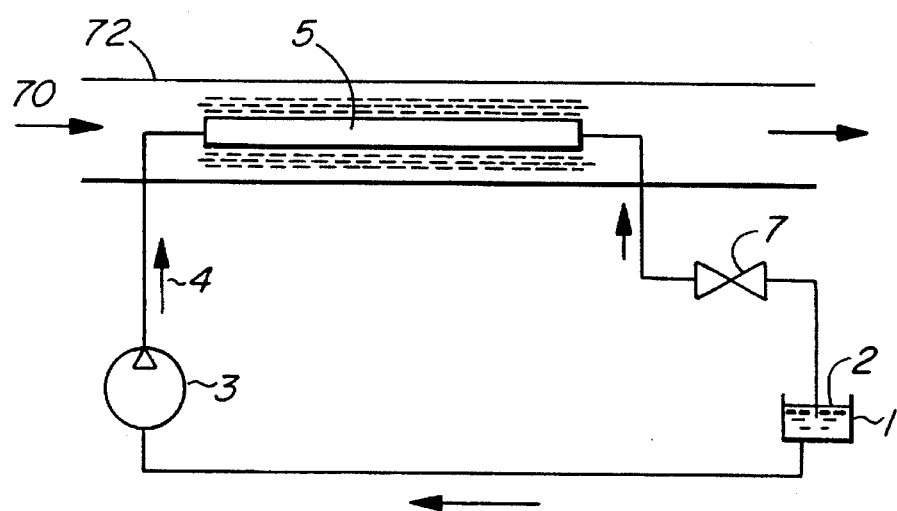
FIG. 10 is a schematic diagram of an acoustic generator adapted to reduce the viscosity of a fluid.

FIG. 10 is a schematic diagram of an acoustic generator according to the invention adapted to reduce the viscosity of a viscous fluid 70 flowing in pipe 72. Acoustic pulses are produced at radiating conduit 5 as described with reference to FIG. 1 above. In this embodiment of the invention, radiating conduit 5 lies within pipe 72. The high energy acoustic pulses emitted from radiating conduit 5 interact with fluid 70 in the region of fluid 70 adjacent to radiating conduit 5 and reduce the viscosity of fluid 70.

If radiating conduit 5 is positioned at the center of pipe 72, as shown in FIG. 8, then radiating conduit 5 may be symmetrical about its axis so that all of fluid 70 is equally treated.

An apparatus similar to the apparatus of FIG. 1 may also be used to reduce the viscosity of a viscous fluid. The viscous fluid is used in place of working fluid 2 in the apparatus of FIG. 1. As described above, pressure pulses are created within radiating conduit 5 as valve 7 is cycled between its open and closed states. The pressure pulses act on the viscous fluid within radiating conduit 5 to reduce its viscosity. Of course, the apparatus of FIG. 1 can be used in this manner for viscosity reduction only if the viscosity of the viscous fluid is initially low enough that it can be pumped through radiating conduit 5 by pump 3 at a significant velocity.

Figure 11:
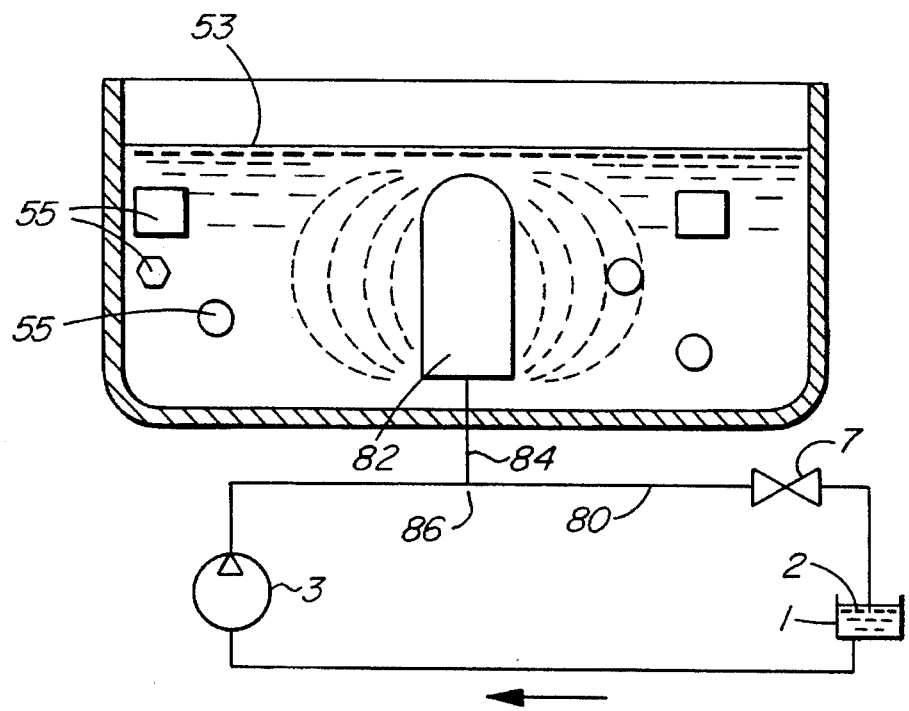
FIG. 11 is a schematic view of an alternative embodiment of an acoustic generator having a compliant radiator in fluid connection with the interior of a rigid conduit.

FIG. 11 is a schematic view of an alternative embodiment of the invention adapted for cleaning items. In the embodiment of FIG. 11, acoustic waves are generated by causing a water hammer within a rigid walled conduit 80. Acoustic waves are radiated into cleaning fluid 53 by means of a compliant radiator 82 in fluid connection with the working fluid 2 inside rigid conduit 80. This is in contrast to the embodiments of the invention described above in which water hammer pressure pulses act against compliant walls of a radiating conduit which move to generate acoustic waves in the fluid surrounding the radiating conduit.

The device of FIG. 11 is similar to the device of FIG. 6. It provides a hydraulic circuit comprising fluid storage tank I containing a working fluid 2, pump 3, rigid conduit 80, valve 7 and fluid return conduit 9. Pump 3 draws working fluid 2 from fluid storage tank 1 and forces it to flow at high velocity through rigid conduit 80. Water hammer pulses are generated within rigid conduit 80 by closing valve 7 in the same manner as is described above with reference to FIG. 1.

A compliant radiator 82 is provided to convert the water hammer pressure pulses in rigid conduit 80 into acoustic pulses in cleaning fluid 53. The interior of compliant radiator 82 is in fluid communication with the interior of rigid conduit 80 through conduit 84. Conduit 84 joins rigid conduit 80 at tee 86. When a water hammer pressure pulse propagates along rigid conduit 80 past tee 86 the sudden overpressure at the opening of conduit 84 forces working fluid 2 to flow from the interior of rigid conduit 80 into conduit 84 thus expanding compliant radiator 82. The sudden expansion of compliant radiator 82 generates a mass flow and acoustic waves in cleaning fluid 53 surrounding compliant radiator 82. Compliant radiator 82 may be shaped to radiate acoustic pulses into cleaning fluid 53 in a preferred direction. Items to be cleaned 55, for example clothes, can be submerged in cleaning fluid 53 to be acted on by the acoustic waves and flowing cleaning fluid 53.

Figure 12:
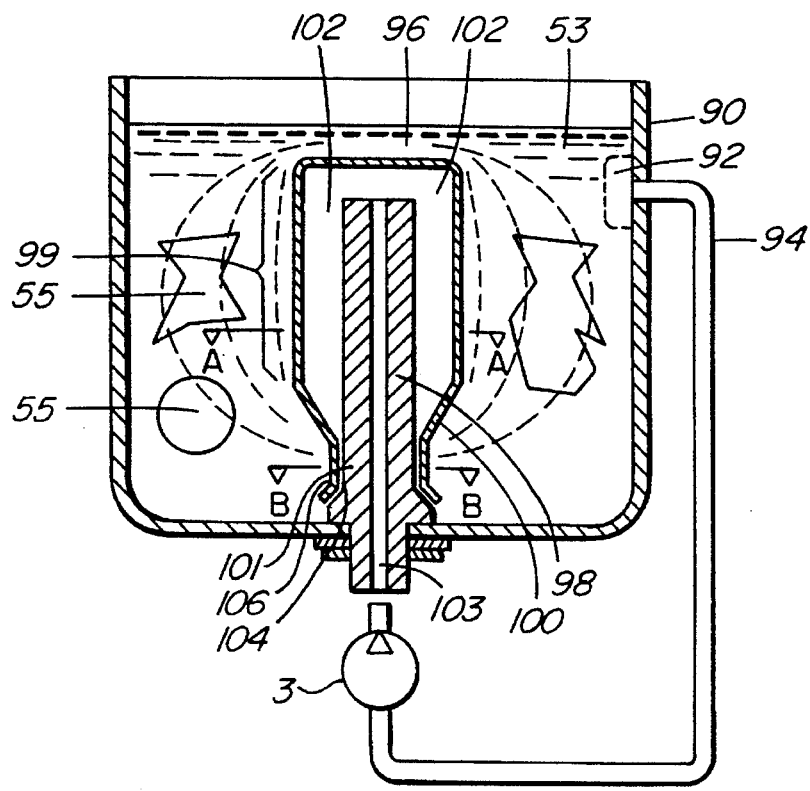
FIG. 12 is a section through an embodiment of the acoustic generator shown in FIG. 1 adapted for washing clothes.

FIG. 12 is a section through an alternative embodiment of the apparatus of FIG. 11 in which cleaning fluid 53 is used as working fluid 2. Items to be cleaned 55 are placed in cleaning fluid 53 inside tub 90. Cleaning fluid 53 is drawn through screen 92 and conduit 94 by pump 3 from where it is forced under pressure into compliant radiator 96 inside tub 90. Compliant radiator 96 comprises mandrel 98 and elastic sleeve 100 which fits over the outer surface of mandrel 98. Mandrel 98 has a large diameter in upper portion 99 of compliant radiator 96 and a narrow waist 101. Elastic sleeve 100 has a narrow portion at its lower end 106 which holds elastic sleeve 100 in place over mandrel 98. Pump 3 forces cleaning fluid 53 through central passage 103 of mandrel 98 into narrow slots 102. Narrow slots 102 form cavities bounded by mandrel 98 on the inside and elastic sleeve 100 on the outside. Cleaning fluid 53 flows down through vertical narrow slots 102 (which are also shown in FIG. 13A) and out into tub 90 through a narrow annular region 104 (which is also shown in FIG. 13B) at the lower end 106 of elastic sleeve 100 between elastic sleeve 100 and mandrel 98.

Annular region 104 acts as a valve to periodically interrupt the flow of cleaning fluid 53 out from narrow slots 102.

As the velocity of flow of cleaning fluid 53 in annular region 104 increases, the pressure of cleaning fluid 53 in annular region 104 is reduced by the Bernoulli effect. When the velocity of cleaning fluid 53 within annular region 104 reaches a critical value, the hydrostatic pressure of cleaning fluid 53 in tub 90 acting on the outside of elastic sleeve 100 in its portion adjacent to annular region 104 becomes sufficient to force elastic sleeve 100 against mandrel 98 in annular region 104, thereby shutting off the flow of fluid through annular region 104. Each time the flow of cleaning fluid 53 through annular region 104 is interrupted elastic sleeve 100 pulses outward as cleaning fluid 53 continues to be pumped into narrow slots 102. The resultant agitation of cleaning fluid 53 in tub 90 and acoustic waves radiated from elastic sleeve 53 into tub 90 act on items to be cleaned 55 in tub 90.

Figures 13A, 13B:
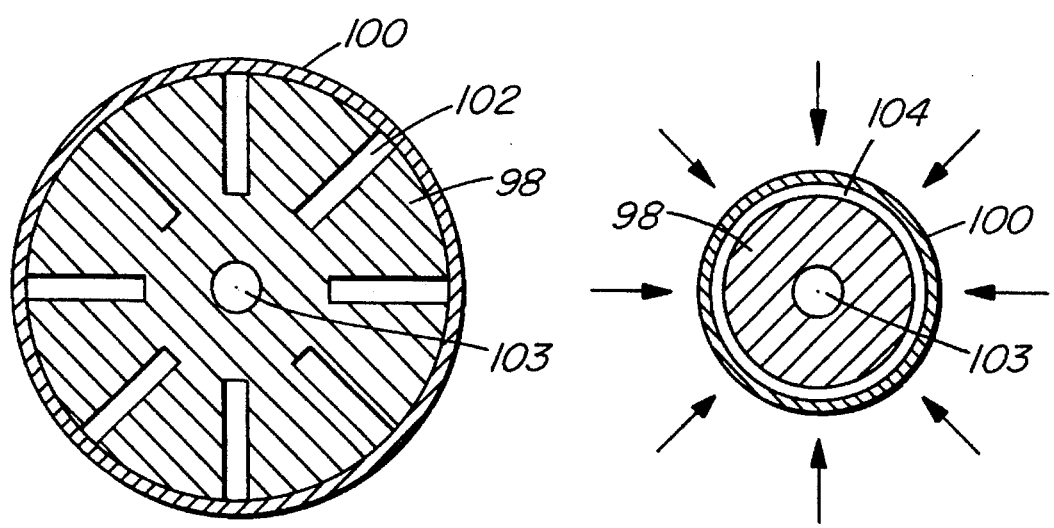
FIGS. 13A and 13B are sections through the radiator in the acoustic generator of FIG. 12.

FIG. 13A is a section through upper portion 99 of compliant radiator 96 on plane A—A shown in FIG. 12. Elastic sleeve 100 is closely fitted over the outer surface of mandrel 98. Narrow slots 102 pass down through upper portion 99 of mandrel 98 beneath elastic sleeve 100 to form channels for the flow of cleaning fluid 53. Narrow slots 102 have a small cross sectional area so that cleaning fluid 53 flows through narrow slots 102 at a high velocity for a given rate of flow of cleaning fluid 53. Narrow slots 102 are narrow to prevent elastic sleeve 100 from being sucked into narrow slots 102 by the flow of cleaning fluid 53 within narrow slots 102.

FIG. 13B is a section through compliant radiator 96 on plane B—B shown in FIG. 12. Plane B—B cuts through waist 101 of mandrel 98 and FIG. 13B therefore shows annular region 104 between mandrel 98 and elastic sleeve 100. The hydrostatic pressure of cleaning fluid 53 acting on the outside of elastic sleeve 100 is indicated by arrows.

Figure 14:
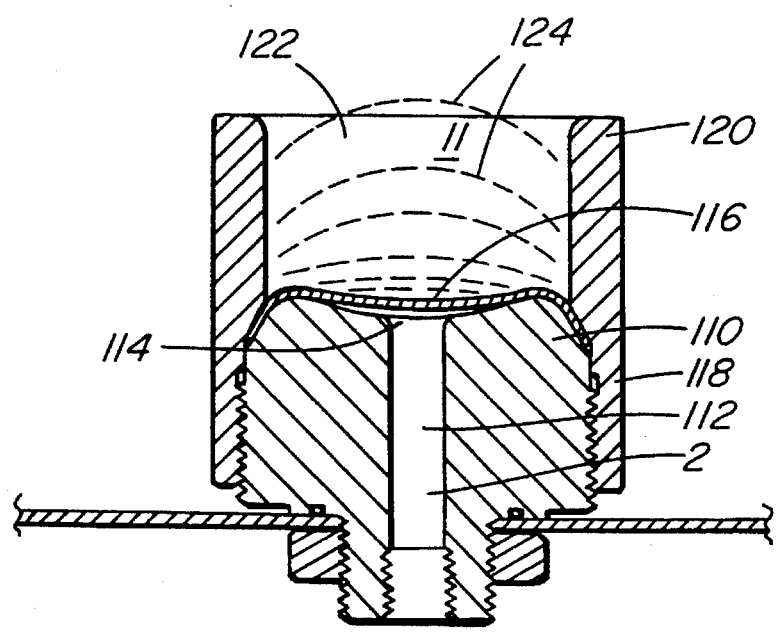
FIG. 14 is a section through a compliant radiator which may be used for generating acoustic waves according to the invention.

FIG. 14 is a section through a compliant radiator which may be used with apparatus similar to that shown in FIG. 11. The compliant radiator has a body 110 and an interior passage 112 penetrating through body 110. Interior passage 112 is filled with a working fluid 2 and is in fluid communication with a conduit (not shown) in which water hammer pulses can be generated.

Outlet 114 of interior passage 112 is blocked by flexible diaphragm 116. The outer side of flexible diaphragm 116 is in contact with a fluid medium 11 into which it is desired to introduce acoustic pulses. Flexible diaphragm 116 is compliant so that pressure pulses transmitted through interior passage 112 are transmitted through flexible diaphragm 116 into fluid medium 11.

Flexible diaphragm 116 is held in place over outlet 114 by nut 118 which clamps the outer periphery of flexible diaphragm 116 between body 110 and nut 118. Nut 118 is provided with a flange 120 which forms a cylindrical channel 122 concentric with the axis of flexible diaphragm 116. Acoustic pulses emitted from flexible diaphragm 116 are guided along channel 199 by flange 120 as indicated by the acoustic wave fronts illustrated as dashed lines 124.

FIG. 15 shows a solenoid operated valve 130 which may be used to interrupt the flow of working fluid 2 in the invention. Valve 130 comprises valve body 132, fluid inlet 134 and fluid outlet 135. When valve 130 is open, fluid flows in through inlet 134, through orifice 138 and out through outlet 135. Valve 130 is normally closed by piston 136 which blocks orifice 138. Piston 136 is forced into orifice 138 by spring 140. Valve 130 is opened by means of solenoid 142 which draws piston 136 away from orifice 138 against the force of spring 140. The rate at which valve 130 is opened and shut depends upon the spring constant of spring 140 and upon the rate at which solenoid 142 is energized and de-energized.

FIG. 16 is a section through a flow operated valve 150 which may be used to rapidly interrupt the flow of working fluid 2 in a conduit (not shown). Valve 150 comprises a valve body 152, a fluid inlet 154, a fluid outlet 156 and a sliding piston 158. Fluid flows through fluid inlet 154 into cavity 160 inside valve body 152 and out through outlet 156. Sliding piston 158 has a tapered plug 162 at its end toward outlet 156. Tapered plug 162 engages valve seat 166 and blocks the flow of fluid through valve 150 when sliding piston 158 slides towards outlet 156.

In no-flow conditions, sliding piston 158 is biased away from outlet 156 by spring 164 leaving a restricted opening between tapered plug 162 and valve seat 166. When fluid is forced into inlet 154, the fluid flows into central cavity 160, around tapered plug 162, through the restricted opening between tapered plug 162 and valve seat 166 and out through outlet 156. Due to the Bernoulli effect, the pressure of the rapidly flowing fluid in the opening between tapered plug 162 and valve seat 166 is lower than the fluid pressure in other parts of interior cavity 160. The result is that tapered plug 162 is sucked toward valve seat 166 against the action of spring 164 until valve 150 is closed. As soon as valve 150 is closed, the fluid flow around tapered plug 162 ceases and spring 164 draws tapered plug 162 away from valve seat 166 at which point the process repeats itself. The rate of operation of valve 150 may be adjusted by varying the spring constant of spring 164, the mass of sliding piston 158, the shapes of tapered plug 162 and valve seat 166 and the fluid pressure at the inlet 154 of valve 150.

FIG. 17 is a section through a cam-driven valve 170 which may be used to interrupt the flow of fluid in a conduit (not shown). Valve 170 has a valve body 172, a fluid inlet, 174 and a fluid outlet passage 176. Fluid flows into valve 170 through inlet 172 into chamber 178 from where it flows out through outlet passage 176. The passage of fluid out from chamber 178 through outlet passage 176 can be blocked by plug 180 which engages valve seat 182 at the inner end of outlet passage 176. Plug 180 is mounted at the end of reciprocating rod 184 which passes out of valve body 172 through seals 186. The end of reciprocating rod 184 is biased against cam 190 by spring 192. Cam 190 is rotated by a motor (not shown). As cam 190 rotates, reciprocating rod 184 reciprocates as its end follows the profile of cam 190. Valve 170 is alternately opened and closed as plug 180 moves into and out of contact with valve seat 182.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An acoustic generator comprising:

(a) a source of pressurized working fluid;

(b) a conduit communicating with said source, said conduit carrying a flow of working fluid from said source within said conduit;

(c) a valve at a location spaced from said source, said valve capable of interrupting said flow of said working fluid out of said conduit; and (d) control means for repeatedly closing and opening said valve at a frequency greater than 3 Hz to produce a water hammer within said conduit each time said valve is closed, wherein said valve is a solenoid activated valve and said control means is an electronic timer further comprising a detector for detecting water hammer within said conduit and for producing a control signal whenever water hammer is detected within said conduit wherein said control means is adapted to open said valve in response to said control signal.

2. An acoustic generator comprising:
(a) a source of pressurizing working fluid;
(b) a conduit communicating with said source, said conduit carrying a flow of working fluid from said source within said conduit;
(c) a valve located in said conduit at a location downstream from said source, said valve comprising a housing, an aperture within said housing, a passage extending in said housing to said aperture for flow of said working fluid through said housing and said aperture, a valve member movable between an open position wherein said valve member does not block said aperture and a closed position wherein said valve member substantially blocks said aperture and actuator means for moving said valve member between said closed and open positions, said valve member capable of generating a water hammer within said conduit by substantially interrupting said flow of said working fluid in said conduit when said working fluid is flowing in said conduit and said valve member is moved to said closed position; said actuator means capable of retaining said valve member in said open position for a time sufficient to allow said working fluid to commence flowing through said conduit and said valve when said valve is in said open position; and
(d) control means for continuously, at a frequency greater than 3 Hertz, operating said actuator means to move said valve member from said closed position to said open position retaining said valve member in said open position for a period sufficient to allow said working fluid to commence flowing through said conduit and said valve with sufficient velocity to produce a water hammer within said conduit when said valve member is moved to said closed position, and again moving said valve member to said closed position to produce a continuous series of water hammer acoustic pulses within said conduit wherein said conduit is bent into a spiral.

3. An acoustic generator comprising:
(a) a source of pressurized working fluid;
(b) a conduit communicating with said source, said conduit carrying a flow of working fluid from said source within said conduit;
(c) a valve located in said conduit at a location downstream from said source, said valve comprising a housing, an aperture within said housing, a passage extending in said housing to said aperture for flow of said working fluid through said housing and said aperture, a valve member movable between an open position wherein said valve member does not block said aperture and a closed position wherein said valve member substantially blocks said aperture and actuator means for moving said valve member between said closed and open positions, said valve member capable of generating a water hammer within said conduit by substantially interrupting said flow of said working fluid in said conduit when said working fluid is flowing in said conduit and said valve member is moved to said closed position; said actuator means capable of retaining said valve member in said open position for a time sufficient to allow said working fluid to commence flowing through said conduit and said valve when said valve is in said open position; and (d) control means for continuously, at a frequency greater than 3 Hertz, operating said actuator means to move said valve member from said closed position to said open position, retaining said valve member in said open position for a period sufficient to allow said working fluid to commence flowing through said conduit and said valve with sufficient velocity to produce a water hammer within said conduit when said valve member is moved to said closed position, and again moving said valve member to said closed position to produce a continuous series of water hammer acoustic pulses within said conduit wherein said conduit has the form of a flattened tube.

4. An acoustic generator comprising:
(a) a source of pressurized working fluid;
(b) a conduit communicating with said source, said conduit carrying a flow of working fluid from said source within said conduit;
(c) a valve located in said conduit at a location downstream from said source, said valve comprising a housing, an aperture within said housing, a passage extending in said housing to said aperture for flow of said working fluid through said housing and said aperture, a valve member movable between an open position wherein said valve member does not block said aperture and a closed position wherein said valve member substantially blocks said aperture and actuator means for moving said valve member between said closed and open positions, said valve member capable of generating a water hammer within said conduit by substantially interrupting said flow of said working fluid in said conduit when said working fluid is flowing in said conduit and said valve member is moved to said closed position; said actuator means capable of retaining said valve member in said open position for a time sufficient to allow said working fluid to commence flowing through said conduit and said valve when said valve is in said open position;
(d) control means for continuously, at a frequency greater than 3 Hertz, operating said actuator means to move said valve member from said closed position to said open position, retaining said valve member in said open position for a period sufficient to allow said working fluid to commence flowing through said conduit and said valve with sufficient velocity to produce a water hammer within said conduit when said valve member is moved to said closed position, and again moving said valve member to said closed position to produce a continuous series of water hammer acoustic pulses within said conduit; and
(e) a delivery conduit having a larger internal diameter than said conduit between said source of pressurized working fluid and said conduit further comprising a tapered velocity transformer between said delivery conduit and said conduit.

5. An acoustic generator comprising:
(a) a source of pressurized working fluid;
(b) a conduit communicating with said source, said conduit carrying a flow of working fluid from said source within said conduit;
(c) a valve located in said conduit at a location downstream from said source, said valve comprising a housing, an aperture within said housing, a passage extending in said housing to said aperture for flow of said working fluid through said housing and said aperture, a valve member movable between an open position wherein said valve member does not block said aperture and a closed position wherein said valve member substantially blocks said aperture and actuator means for moving said valve member between said closed and open position, said valve member capable of generating a water hammer within said conduit by substantially interrupting said flow of said working fluid in said conduit when said working fluid is flowing in said conduit and said valve member is moved to said closed position; said actuator means capable of retaining said valve member in said open position for a time sufficient to allow said working fluid to commence flowing through said conduit and said valve when said valve is in said open position;

(d) control means for continuously, at a frequency greater than 3 Hertz, operating said actuator means to move said valve member from said closed position to said open position, retaining said valve member in said open position for a period sufficient to allow said working fluid to commence flowing through said conduit and said valve with sufficient velocity to produce a water hammer within said conduit when said valve member is moved to said closed position, and again moving said valve member to said closed position to produce a continuous series of water hammer acoustic pulses within said conduit;

further comprising means to harness said acoustic generator to remove particles from a dirty fluid, said means comprising:

(e) a treatment chamber surrounding said conduit;

(f) a dirty fluid inlet for introducing said dirty fluid into said treatment chamber and flowing said dirty fluid with acoustic waves from said conduit and for driving said suspended particles from said dirty fluid into a first region of said treatment chamber by means of said acoustic waves to produce a concentrated dirty fluid in said first region and a cleaned fluid in a second region;

(g) a first outlet in said first region for removing said concentrated dirty fluid; and (h) a second outlet in said second region for removing said cleaned fluid.

6. The acoustic generator of claim 5 wherein said working fluid is said dirty fluid, said dirty fluid inlet is the outlet of said valve and further comprising a diffuser bet-ween the outlet of said valve and the interior of said treatment chamber.

7. An acoustic cleaner for cleaning a workpiece in a cleaning fluid, said cleaner comprising:

(a) a source of pressurized working fluid;

(b) a conduit communicating with said source, said conduit having a wall for confining a flow of working fluid from said source within said conduit, at least a portion of said wall being in contact with said cleaning fluid;

(c) a valve connected to said conduit at its end away from said source, said valve comprising a housing and a rigid valve member within said housing movable between open and closed positions said valve member capable of substantially blocking the flow of said working fluid out of said conduit when said valve member is in said closed position and capable of allowing said working fluid to flow through said conduit and said valve when said valve member is in said open position; and (d) control means for continuously closing said valve, opening said valve and holding said valve open for a period sufficient to allow said working fluid to commence flowing through said conduit and said valve with sufficient velocity, to produce a water hammer within said conduit each time said valve is closed.

8. The acoustic cleaner of claim 7 wherein said working fluid is cleaning fluid.

9. The acoustic cleaner of claim 8 further comprising a tube having a fixed end communicating with the outlet of said valve and a free end, said free end being directable toward said workpiece.

10. Apparatus for lowering the viscosity of a viscous fluid, said apparatus comprising:

(a) a chamber containing said viscous fluid, said chamber having an inlet and an outlet;

(b) means for providing a pressurized working fluid at a pressure;

(c) a conduit communicating with said source, said conduit passing through said chamber and carrying a flow of working fluid from said source within said conduit;

(d) a valve capable of blocking the flow of said working fluid in said conduit; and (e) control means for repeatedly closing said valve, opening said valve and holding said valve in a non-blocking state for a period sufficient to allow said working fluid to commence flowing through said conduit and said valve, to produce a water hammer within said conduit each time said valve is closed wherein said pressure is sufficiently high that during said period when said valve is in said non-blocking state said pressurized working fluid will attain a velocity of flow through said conduit and said valve sufficient to cause said water hammer within said conduit when said valve is closed.

11. The apparatus of claim 10 wherein said chamber is a pipe.

12. The apparatus of claim 11 wherein said conduit is concentric with said pipe.

13. Apparatus for lowering the viscosity of a viscous fluid, said apparatus comprising:

(a) means for pressurizing said viscous fluid;

(b) a conduit communicating with said pressurizing means, said conduit capable of carrying a flow of viscous fluid from said pressurizing means within said conduit;

(c) a valve comprising a housing, a valve member having a flow-impeding portion, and an aperture, said valve member movable within said housing between a closed position wherein said flow-impeding portion substantially blocks said aperture and an open position wherein said flow-impeding portion does not block said aperture, said valve capable of substantially impeding said flow of said viscous fluid in said conduit when said valve member is in said closed position, wherein said flow impeding portion is not substantially deformable under the pressures created by a water hammer in said conduit; and (d) control means for repeatedly closing said valve, opening said valve and holding said valve open for a period sufficient to allow said working fluid to commence flowing through said conduit and said valve, to produce a water hammer within said conduit each time said valve is closed.

14. A method of producing work at a point in a first fluid by means of acoustic signals, said method comprising the steps of:

(a) connecting a source of pressurized working fluid to the inlet of a conduit having an inlet and an outlet and a portion of said conduit communicating with said first fluid;

(b) allowing said working fluid to flow through said conduit with sufficient velocity to create a water hammer within said conduit if said flow of fluid is substantially interrupted;

(c) substantially blocking the flow of said working fluid at said outlet sufficient rapidly to cause a water hammer within said conduit, said water hammer causing acoustic signals to be radiated in said first fluid from said conduit to said point;

(d) removing said blockage of said working fluid from said outlet; and (e) continuously repeating steps (b), (c) and (d) at a frequency sufficient to carry out said work by means of a continuous series of acoustic pulses produced by said water hammers and having a frequency greater than 3 Hertz wherein said work is acoustic cleaning of an object.

15. A method of producing work at a point in a first fluid by means of acoustic signals, said method comprising the steps of:

(a) connecting a source of pressurized working fluid to the inlet of a conduit having an inlet and an outlet and a portion of said conduit communicating with said first fluid;

(b) allowing said working fluid to flow through said conduit with sufficient velocity to create a water hammer within said conduit if said flow of fluid is substantially interrupted;

(c) substantially blocking the flow of said working fluid at said outlet sufficiently rapidly to cause a water hammer within said conduit, said water hammer causing acoustic signals to be radiated in said first fluid from said conduit to said point;

(d) removing said blockage of said working fluid from said outlet; and (e) continuously repeating steps (b), (c) and (d) at a frequency sufficient to carry out said work by means of a continuous series of acoustic pulses produced by said water hammers and having a frequency greater than 3 Hertz wherein said work is the reduction of viscosity of a viscous fluid.

16. A method of producing work at a point in a first fluid by means of acoustic signals, said method comprising the steps of:

(a) connecting a source of pressurized working fluid to the inlet of a conduit having an inlet and an outlet and a portion of said conduit communicating with said first fluid;

(b) allowing said working fluid to flow through said conduit with sufficient velocity to create a water hammer within said conduit if said flow of fluid is substantially interrupted;

(c) substantially blocking the flow of said working fluid at said outlet sufficiently rapidly to cause a water hammer within said conduit, said water hammer causing acoustic signals to be radiated in said first fluid from said conduit to said point;

(d) removing said blockage of said working fluid from said outlet; and (e) continuously repeating steps (b), (c) and (d) at a frequency sufficient to carry out said work by means of a continuous series of acoustic pulses produced by said water hammers and having a frequency greater than 3 Hertz wherein said work is driving suspended particles out of a volume of fluid.

17. An acoustic generator for delivering an acoustic signal to a workpiece in a first fluid for doing work at said workpiece, said acoustic generator comprising:

(a) a source of pressurized fluid;

(b) a conduit having an inlet and an outlet, said inlet in fluid communication with said source of pressurized fluid, said conduit being at least partially submersed in said first fluid at a point spaced apart from said workpiece;

(c) a valve comprising a housing and a valve member movable within said housing, said valve in fluid communication with said outlet for blocking the flow of said pressurized fluid at a point downstream from said outlet said valve having a closed state in which flow of fluid through said valve is substantially blocked by said valve member and an open state in which working fluid may flow through said conduit and said valve; and (d) control means for repeatedly switching said valve to said open state for an interval to allow said pressurized fluid to flow through said conduit, switching said valve to said closed state to at least partially block the flow of said pressurized fluid at said valve to cause a water hammer within said conduit, said water hammer causing acoustic impulses to radiate from said conduit through said first fluid to do said work on said workpiece and waiting for an interval wherein the pressure of said source of pressurized fluid is sufficiently high that during said interval when said valve is in said open state said pressurized fluid will attain a velocity of flow through said conduit and said valve sufficient to cause said water hammer within said conduit when said valve is switched to said closed state.

18. The acoustic generator of claim 1 wherein said valve member comprises a flow-impeding portion, said flow-impeding portion substantially blocks said aperture when said valve member is in said closed position and said flow-impeding portion is not substantially deformable under pressures created by a water hammer in said conduit.

19. The acoustic generator of claim 18 wherein said water hammer is created in said conduit upstream from said valve.

20. The acoustic generator of claim 18 wherein said water hammer is created in said conduit downstream from said valve.

* * * * *